United States Patent
McEwan et al.

(10) Patent No.: US 7,810,523 B2
(45) Date of Patent: Oct. 12, 2010

(54) DUCT SEEPAGE REDUCTION

(75) Inventors: Ian Kenneth McEwan, Aberdeen (GB);
Ian Beveridge Chirnside, Aberdeen (GB); Nicholas John Ryan, Aberdeenshire (GB)

(73) Assignee: Brinker Technology Limited, Aberdeen (GB)

( * ) Notice: Subject to any disclaimer, the term of this patent is extended or adjusted under 35 U.S.C. 154(b) by 753 days.

(21) Appl. No.: 10/513,157

(22) PCT Filed: Apr. 29, 2003

(86) PCT No.: PCT/GB03/01847

§ 371 (c)(1),
(2), (4) Date: Jul. 12, 2005

(87) PCT Pub. No.: WO03/093713

PCT Pub. Date: Nov. 13, 2003

(65) Prior Publication Data

US 2005/0284530 A1    Dec. 29, 2005

(30) Foreign Application Priority Data

Apr. 29, 2002  (GB) ................................ 0209771.5

(51) Int. Cl.
*F16L 55/18*   (2006.01)
*B05D 7/22*    (2006.01)
*B05D 1/18*    (2006.01)
*G01M 3/04*    (2006.01)
*C09K 3/10*    (2006.01)

(52) U.S. Cl. .................. 138/97; 427/230; 427/238; 427/438; 73/49.8; 106/33

(58) Field of Classification Search ................. 427/438; 73/49.8; 106/33
See application file for complete search history.

(56) References Cited

U.S. PATENT DOCUMENTS 3,144,049 A  *  8/1964  Ginsburgh ................... 138/97

(Continued)

FOREIGN PATENT DOCUMENTS

GB           1101870      *  1/1968

(Continued)

OTHER PUBLICATIONS

Merriam-Webster Dictionary "Streamer".*

(Continued)

*Primary Examiner*—Timothy H Meeks
*Assistant Examiner*—Mandy C Louie
(74) *Attorney, Agent, or Firm*—Woodcock Washburn, LLP

(57) ABSTRACT

A method is provided for reducing seepage through a leak (5) in a duct (1), the leak being defined in terms of its maximum dimension $x_L$ and its maximum width in an orthogonal direction $y_L$ and the effective size of the leak being given by formula (1): $S_L = (x^2_L + y^2_L)^{1/2}$. A plurality of sealing elements (3) are introduced into the duct, the sealing elements having dimensions a, b and c in mutually orthogonal directions and the effective size $S_E$ of the sealing element being given by formula (2): $S_E = (a^2 + b^2 + c^2)^{1/2}$. The sealing elements have an effective size $S_E$, which is less than the effective size of the leak $S_L$, so that sealing elements (3A) are drawn to the leak locality and caused, by reason of a pressure differential at that locality and attributable to the leak, to move over the leak and reduce the seepage.

14 Claims, 1 Drawing Sheet

U.S. PATENT DOCUMENTS

| | | | | |
|---|---|---|---|---|
| 3,227,572 | A | | 1/1966 | Rundle et al. .................. 117/2 |
| 3,358,703 | A | | 12/1967 | Ginsburgh et al. |
| 3,472,285 | A | | 10/1969 | Ginsburgh et al. |
| 3,865,662 | A | * | 2/1975 | Segal ........................... 156/94 |
| 4,487,707 | A | * | 12/1984 | Holzknecht .................. 252/68 |
| 4,582,091 | A | * | 4/1986 | Ells .............................. 138/97 |
| 4,627,471 | A | * | 12/1986 | Parkes et al. ................. 138/97 |
| 5,391,224 | A | | 2/1995 | Pasuit et al. .................. 106/33 |
| 5,980,984 | A | * | 11/1999 | Modera et al. ............. 427/237 |
| 6,159,276 | A | | 12/2000 | Barks ......................... 106/33 |
| 6,324,757 | B1 | | 12/2001 | Barks .................... 29/888.011 |

FOREIGN PATENT DOCUMENTS

| | | | |
|---|---|---|---|
| GB | 2088235 A | * | 6/1982 |
| WO | WO 00/28296 A1 | * | 5/2000 |
| WO | WO 01/86191 A1 | * | 11/2001 |

OTHER PUBLICATIONS

Norwegian Official Action, Dec. 21, 2009, 4 pages.
Translation of the Official Action, Dec. 21, 2009, 1 page.

* cited by examiner

DUCT SEEPAGE REDUCTION

CROSS-REFERENCES TO RELATED APPLICATIONS

The present application is a national phase application corresponding to PCT/GB03/01847, filed Apr. 29, 2003, which claims priority from GB 0209771.5, filed Apr. 29, 2002. These applications are hereby incorporated by reference in their entireties.

FIELD OF THE INVENTION

The present invention relates to a method for reducing seepage through a leak in a duct, such as a fluid-carrying pipework.

DESCRIPTION OF THE RELATED ART

Significant areas of fluid carrying ducts, once installed as part of a pipework system, may be substantially inaccessible or only accessible with considerable difficulty. For example, mains water distribution systems employ vast lengths of buried pipework which involves expensive and time-consuming excavation to expose, for scrutiny and/or repair, when leakage flow is suspected from a particular area of pipe. A similar situation exists in relation to oil pipelines. Some oil pipelines may be accessible in that they are below the sea. Nevertheless, sub-sea access is difficult, expensive and time consuming.

A technique for locating leakage flow without requiring major excavation is disclosed in International Patent Application No. WO 00/28296, in which a technique is described in which a sensor means is provided within a pipe for detecting characteristics of fluid flowing within the pipe. The detected characteristics are recorded and used to evaluate a fluid flow field characteristic, which is compared with a reference fluid flow field characteristic for that pipe to thereby obtain data concerning a leak. The comparison may usefully be effected by means including a neural network. However, it has been found that the effects of the leak on the fluid flow field are very difficult to detect. In addition, it may still be necessary to excavate or otherwise uncover the leaking pipework in order to control the leakage flow.

There are also occasions, particularly in the oil, gas and nuclear industries, when a rapid response to a leakage flow (or to a lack of containment generally) is essential. In addition there is often the need, having reduced the initial leakage flow of fluid from a leak, to accurately locate the leak so that a permanent repair may be made, or other remedial action taken. Still further, there may be a need in some operational circumstances to shield or protect workers, engaged in the location of leaks and/or the associated repairs, from the leaking fluid.

International Patent Application No. WO 01/86191 discloses a method and apparatus for duct leakage control wherein a sheet-like plastic sheet sealing member is introduced into the duct and is automatically drawn or otherwise guided to the locality of a leak and is caused, by reason of a pressure differential at that locality and attributable to the leak, to move into and stem or seal the leak. A plurality of individual sealing members of differing buoyancy can be introduced into the duct, each capable of being carried along at a predetermined level in the duct by the flow of fluid, so that a sealing element can be "captured" by the leak. The sealing element may carry a tagging device which can be used to assist in locating the leakage site.

However, some ducts contain very small leaks and the seepage there through may not be adequately controlled by the aforementioned prior art methods. Seepage may occur, for example, due to corrosion producing pin-hole apertures in the duct wall, the action of anaerobic bacteria, or erosion of the duct wall due to pitting by the solid phase of a multi-phase flow. Cracking of the duct may also occur due to structural failure of joints or flanges, or duct wall fatigue. The volume loss of fluid in the main duct due to seepage may be small relative to the flow volume, i.e. a trickle leakage flow, but nevertheless important, for example for reasons of health and safety (such as in the case of a pipe carrying gas), or for environmental reasons (such as in the case of a pipe carrying hydrocarbons). Also, such small leaks may develop into much larger leaks in timer which may eventually result in complete pipeline failure, requiring prolonged shut-down to effect pipeline repair.

It is an object of the present invention to provide a method for overcoming the aforementioned disadvantages of the prior art and which can reduce seepage through a leak in a duct.

SUMMARY OF THE INVENTION

According to the present invention there is provided a method for reducing seepage through a leak in a liquid transporting duct, the method comprising: introducing a plurality of sealing elements into the liquid being transported within the duct, the sealing elements being drawn to the leak locality and caused, by reason of a pressure differential at that locality and attributable to the leak, to move over and build up within the duct at the leak and reduce the seepage therefrom, the sealing elements having an effective size $S_E$ less than the effective size of the leak $S_L$.

The present invention is based on the realisation that for very small leaks the pressure differential resulting from the leakage flow through such a leak is also very low. Furthermore, or very small leaks, if a single sealing element is introduced into the duct with a view to sealing the leak, it will not be "captured" by the leak. Indeed, even if a plurality of such sealing elements are used, there is only a low probability that one will be "captured" by the leak because of the aforesaid pressure differential.

Consequently, the present envisages using a plurality of sealing elements in which the effective size of the sealing element is smaller than the effective size of the leak. As a result, some of the introduced sealing elements will pass close to the small leak and be sufficiently small to be responsive to the low pressure differential. As they respond to the low pressure differential, a number of the sealing elements will be drawn to the leak so that a number of them will build up at the leak location to gradually stem the leak. A single sealing element will not seal or cover the leak.

There is also the realisation that as the leak become partially sealed, the leakage flow is reduced, further reducing the pressure differential and making it even more difficult to have the sealing elements respond to the leakage flow. By having the effective size of the sealing element smaller than the effective size of the leak it is possible to take into account this diminution of the pressure differential as the leakage flow reduces. It should be noted that the present invention does not aim to stop the leak but instead accepts that there will be an incomplete reduction of the leakage flow.

In one embodiment, the leak can be defined in terms of its maximum dimension $x_L$ and its maximum width in an orthogonal direction $y_L$ and the effective size of the leak is given by:—

$$S_L = (x_L^2 + y_L^2)^{1/2} \qquad 1)$$

and wherein the sealing element has dimensions a, b and c in mutually orthogonal directions and the effective size $S_E$ of the sealing element is given by:—

$$S_E = (a^2 + b^2 + c^2)^{1/2} \qquad 2)$$

In another embodiment the effective size of the sealing elements can be calculated the following formula:—

$$S_E = \frac{1}{3}(a_e^3 + b_e^3 + c_e^3)^{1/3} \qquad 4)$$

By way of example, for an approximately circular or square pinhole leak, $x_L$ equals $y_L$ thus formula 1) reduces to $S_L \approx 2^{1/2} x_L$. Alternatively, in the case of seepage through a hairline crack, $y_L$ will be approximately zero, relative to $x_L$, and hence formula 1) reduces to $x_L$.

In the case of an approximately spherical or cubic sealing element a, b and c are substantially equal, and hence formula 2 reduces to $\approx 3^{1/2}$a. Formula 4) would reduce to $3^{1/2}$a/3. Alternatively, in the case of a thin planar square sealing element, c is approximately zero, relative to a which equals b, and hence formula 2) reduces $S_E \approx 2^{1/2}$ a.

Preferably, the sealing elements introduced into the duct have a range of effective sizes.

As a result, it is possible to stem a range of leaks of differing effective sizes.

Conveniently, the sealing elements have a predetermined size distribution.

It has been found that the sealing elements should each have an effective size of 5 mm or less, or an effective size of 1 mm or less, or an effective size of from 0.5 to 0.1 mm.

Herein, "buoyancy" and related terms refer to the density of the sealing elements compared to the density of the fluid within the duct. Thus, "generally neutrally buoyant" refers to the sealing elements having a density which is generally close to the density of the fluid within the duct. Preferably, the density of the sealing elements is within the range of 75% to 125% of the density of the fluid within the duct, more preferably in the range 90 to 110% or more preferably in the range 95 to 105%.

Sealing elements which are substantially neutrally buoyant in the fluid within the duct and have an effective size less than the effective size of the leak can be substantially evenly distributed throughout the fluid within the duct, and are sufficiently small so as to be attracted to the leak by the pressure differential created thereby. As a result, seepage through leaks throughout the duct, i.e. around the circumference of the duct, can be reduced.

The present invention is applicable for reducing seepage from an "open" duct, i.e. a duct through which fluid may be transported from a first location to a second, and from a "closed" duct, i.e. a duct through which fluid may be re-circulated. However, the present invention is particularly suited for use with open ducts, for example pipelines carrying water or crude oil.

The seepage to be reduced may, for example, be due to a pin-hole in the duct wall caused by corrosion, the action of anaerobic bacteria, or erosion of the duct wall due to pitting by the solid phase of a multi-phase flow. Alternatively, the leak may, for example, take the form of a crack in the duct, caused by structural failure of joints or flanges, or duct wall fatigue.

In the method of the present invention, a plurality of sealing elements are introduced into a duct. Typically, a relatively large number (for example, hundreds or thousands) of relatively small sealing elements (for example, 5 mm effective size ($S_E$) or less, as discussed above) may be introduced into a duct to control seepage through a leak therein. To reduce seepage caused by a small leak, such as a pinhole, yet smaller sealing elements will be required. If the leak is small then the reduced pressure zone is correspondingly small, in which circumstances a sealing element having a larger effective size than the leak may not be sufficiently responsive to be attracted by the depressurised zone to reduce seepage through the leak. Thus, to ensure that seepage through a leak can be reduced regardless of the size and position of the leak in the duct, sealing elements of substantially neutral buoyancy having an effective size smaller than the leak are employed in the method of the present invention. Thus, according to the size and shape of leak, in the method of the present invention a relatively small number of sealing elements (for example, less than 1000) may be introduced into the duct in the form of easily distinguishable discrete particulate elements of well defined shape (for example, substantially rectangular planar elements), of relatively large effective size (for example from 1 to 5 mm). Alternatively, a relatively large number of sealing elements (for example, more than 1000) may be introduced into the duct in the form of particulate elements of small effective size (for example from 0.1 to 0.5 mm).

The present invention concerns small leaks, for example seepage through the leak of 0.1 liters per second.

In the method of the present invention, a plurality of sealing elements are introduced into the duct. The number of sealing elements required to effectively reduce seepage through a particular leak in the duct will depend upon the nature of the leak causing the seepage. For example, a much smaller number of sealing elements will be required to effectively reduce seepage through a pinhole leak compared to a crack. Thus, the size, shape and number of sealing elements to be introduced into the duct may be predetermined according to the characteristics of the leak, if known. Alternatively, for example as part of a periodic routine duct maintenance check, a predetermined size distribution of differently sized and shaped sealing elements may be introduced into the duct, when the presence or absence of any leaks in the duct, and hence their characteristics, is unknown. The use of a predetermined size distribution of differently sized sealing elements can also be advantageous in that when the leak is relatively large, both large and small sealing elements will be attracted to the leak, due to the relatively large pressure differential created thereby, but only relatively larger sealing elements may be capable of initially reducing seepage through the leak. However, as seepage through the leak is reduced, the pressure differential will reduce, and hence only the relatively smaller sealing elements will be attracted to the leak.

As previously mentioned herein above, the shape of the sealing elements used in the method of the present invention may be selected according to the particular circumstances in question, for example the type of duct, the type of leak, and the type of fluid within the duct. Thus, in principle there is no restriction on the shape of the sealing elements. For example, the sealing elements may be substantially planar, rectangular elements, substantially spherical, for example beads, or irregularly shaped.

The sealing elements are selected for use in the method of the present invention according to the nature of the fluid carried within the duct. In particular, the sealing elements have a density substantially equal to that of the fluid carried within the duct, i.e. they have "neutral buoyancy" so as to be effectively weightless within the duct, as discussed above. Neutral buoyancy affords the sealing elements a low settling velocity, holding them in suspension by the turbulence which is inherent in most fluid flow within a duct, and helps to ensure that they can reduce seepage around the entire circumference of the duct.

The sealing elements preferably comprise material(s) which is non-abrasive to the duct walls. Suitable materials include plastics materials, for example polyvinyl polymers such as polyethylene and polypropylene. The sealing elements preferably lack sharp edges, which can help prevent them from lodging within the duct at a location where no seepage is occurring, and can also help prevent abrasion of the duct walls.

In the method of the present invention, the sealing elements may be held to the wall of the duct over a leak only by the pressure differential caused by the leak. Thus, if the duct is shut down and depressurised then the pressure differential is removed and the sealing elements may no longer be held over the leak. In some preferred embodiments, at least some sealing elements may thus comprise bonding means, for bonding the sealing element to the duct wall. Such bonding means may enable the sealing elements to remain in situ in the event that the duct is depressurised, or in response to other effects such as changes in aperture dimensions over time, transient pressure waves, or impact from apparatus operating within the duct, such as a pipeline PIG. Such bonding means may, for example, comprise an adhesive substance which can be released over time, in response to heat, pressure, or by exposure to a chemical reagent.

Substantially each sealing element preferably comprises sensing means, for enabling the position of each sealing element to be sensed by a sensor. In this way, the location of the sealing elements can be detected, and hence the longitudinal and radial position of a leak can be determined. Also, the particular arrangement of sealing elements can be determined, and hence the particular type of leak causing the seepage, for example whether the seepage is due to a pinhole or crack.

The sensing means may comprise any suitable identifier which can be detected by a sensor, either internally to or externally of the duct. For example, the sensing means may comprise an identifier which is magnetic, radioactive, fluorescent, piezoelectric, coloured, luminescent, thermal luminescent, an infra-red or ultra-violet emitter, electromagnetic (for example, resonating at a particular frequency), or temperature sensitive, or any other suitable biological or chemical agent. The sensing means may respond to particular environmental conditions present in the vicinity of the leak. For example, the sensing means may respond to the pressure difference across the sealing element over the leak, or the stress thereon imparted thereby, as a result of a liquid-gas phase change (Joule-Thompson effect) which may accompany depressurisation near leak, or in response to light, air, soil or water. The sensing means may activate in response due to passage of a duct traversing system, for example pipeline PIG, which may induce a significant pressure fluctuation.

Sealing elements which comprise sensing means may conveniently comprise a composite of materials in which an identifier is provided on a substrate. For example, a magnetic or radioactive identifier is likely to have a higher density than the fluid being carried within the duct, and hence the identifier must be provided on a substrate having a lower density than that of the fluid being carried within the duct if the sealing elements are to be substantially neutrally buoyant. A particularly preferred sealing element for use in the present invention comprises a higher density magnetic or radioactive identifier on a lower density plastics substrate.

In those preferred embodiments in which the sealing elements comprise sensing means, the sealing elements are sensed by a sensor, which may be provided either internally to or externally of the duct. Thus, the sensor may be incorporated into duct traversing apparatus, for example a pipeline PIG operating within the duct, or externally along the outside of the duct. Internal sensors are generally more appropriate for larger diameter ducts, for example those ducts having accessibility problems, such as remote, buried or sub-sea ducts. External sensors are generally more appropriate for smaller diameter ducts, which are reasonably accessible, such as those generally used in industrial plants. The purpose of the sensor is to scan the duct after release of the sealing elements to detect the presence of sealing elements which have become trapped over a leak in the duct.

As referred to above, the sensor may initially detect the longitudinal position of a leak, i.e. the position of the leak up or downstream. Preferably, the sensor also detects the radial position of the leak, i.e. the position of the leak relative to the circumference of the duct. More preferably, the sensor also detects the density and dimensions of individual or groups of sealing elements positioned on the duct wall. This enables the length and width of leaks to be determined, in addition to their longitudinal and radial position. Once the position and dimensions of the leak have been identified, the section of duct in question may be replaced or repaired as appropriate.

In the method of the present invention, the sealing elements are introduced into the duct upstream of a section of duct to be examined. The sealing elements may be introduced into the duct, for example, through an upstream valve, a "pipeline PIG" launching system, or by "hot-tapping" the duct in the vicinity of the leak.

The sealing elements may be recovered from the duct downstream of the section of duct being examined. For example, the sealing elements may be removed using a strainer, preferably of conical construction so as to minimise blockage of the duct. The sealing elements can thus be recovered, and recycled for reuse. Alternatively, the sealing elements may be sufficiently small that they may be left in the flow of fluid within the duct, without causing any damage to the duct infrastructure downstream. In many cases, a duct will terminate at a processing plant which includes strainers and flow separators. In such cases, the sealing elements may conveniently be removed from the fluid flow as part of the normal operation of the duct. The lower limit of the effective size of the sealing elements may be determined by the method of recovery of the sealing elements from the duct, for example by the mesh size of a strainer.

According to the present invention there is further provided a sealing element for introduction into liquid being transported within a liquid transporting duct and for reduction of seepage through and/or location of a leak therein by building up within the duct at the leak, wherein the leak can be defined in terms of its maximum dimension $x_L$ and its maximum width in an orthogonal direction $y_L$ and the effective size of the leak is given by:—

$$S_L = (x_L^2 + y_L^2)^{1/2} \qquad 1)$$

the sealing element comprising dimensions a, b and c in mutually orthogonal directions and the effective size $S_E$ of the sealing element is given by:—

$$S_E \approx (a^2 + b^2 + c^2)^{1/2} \qquad 2)$$

and wherein the sealing element satisfies the following condition:—

$$S_E < S_L \qquad 3)$$

Preferably, the sealing element comprises a plastics substrate and a magnetic or radioactive sensing means for enabling the sealing element to be sensed by a sensor.

BRIEF DESCRIPTION OF THE DRAWING

Examples of the present invention will now be described in detail with reference to the accompanying drawings in which:—

DESCRIPTION OF THE PREFERRED EMBODIMENT(S)

Figure 2:
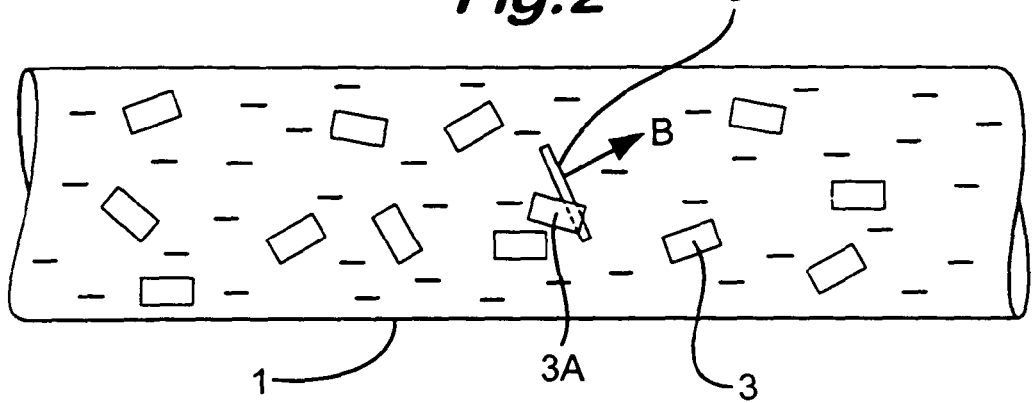
FIG. 2 is a schematic cross-sectional view through the duct downstream from FIG. 1, showing a leak in the duct.
Figure 3:
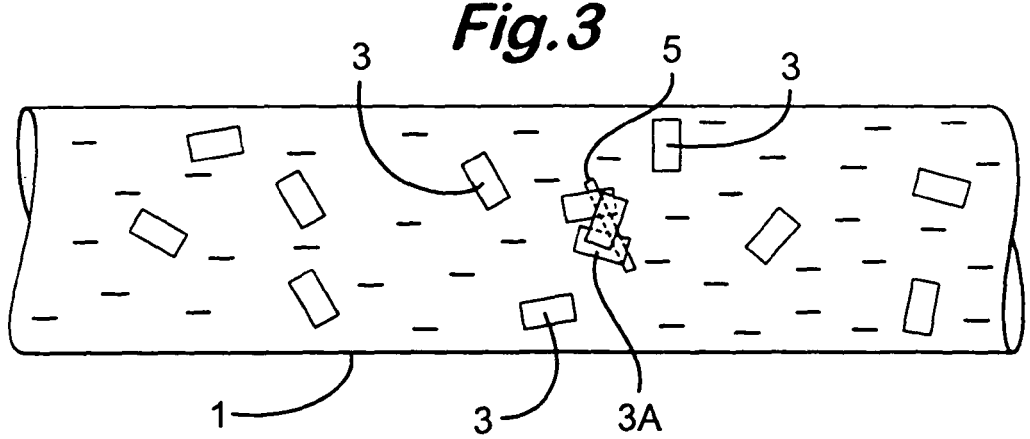

FIG. 3 is the view of FIG. 2 showing sealing elements reducing seepage through the leak.

The present invention is directed towards reducing seepage of fluid from a small leak in a duct, i.e. trickle flow from, for example pin-hole apertures in the wall or hairline cracks of the duct wall. The dimensions of any breach in the wall can be defined in terms of its maximum dimension $x_L$, and its maximum width in an orthogonal direction $y_L$. A measure of the effective size of the leak is then $$S_L = (x_L^2 + y_L^2)^{1/2} \quad 1)$$

The table below gives some examples of typical values of $S_L$ for linear crack-like features with aspect ratios ($x_L/y_L$) of 5 and 10, the dimensions are millimetres.

| Aspect ratio 5 | | | Aspect ratio 10 | | |
| --- | --- | --- | --- | --- | --- |
| $x_L$ | $y_L$ | $S_L$ | $x_L$ | $y_L$ | $S_L$ |
| 0.1 | 0.02 | 0.1 | 0.1 | 0.01 | 0.1 |
| 0.5 | 0.1 | 0.51 | 0.5 | 0.05 | 0.5 |
| 1 | 0.2 | 1.02 | 1 | 0.1 | 1 |
| 1.43 | 0.29 | 1.46 | 1.43 | 0.14 | 1.44 |
| 1.88 | 0.38 | 1.92 | 1.88 | 0.19 | 1.89 |
| 2.33 | 0.47 | 2.38 | 2.33 | 0.23 | 2.34 |
| 2.78 | 0.56 | 2.84 | 2.78 | 0.28 | 2.8 |
| 3.23 | 0.65 | 3.3 | 3.23 | 0.32 | 3.25 |
| 3.68 | 0.74 | 3.76 | 3.68 | 0.37 | 3.7 |
| 4.13 | 0.83 | 4.22 | 4.13 | 0.41 | 4.15 |
| 4.58 | 0.92 | 4.67 | 4.58 | 0.46 | 4.61 |
| 5.03 | 1.01 | 5.13 | 5.03 | 0.5 | 5.06 |
| 5.48 | 1.1 | 5.59 | 5.48 | 0.55 | 5.51 |
| 5.93 | 1.19 | 6.05 | 5.93 | 0.59 | 5.96 |
| 6.38 | 1.28 | 6.51 | 6.38 | 0.64 | 6.42 |
| 6.83 | 1.37 | 6.97 | 6.83 | 0.68 | 6.87 |
| 7.28 | 1.46 | 7.43 | 7.28 | 0.73 | 7.32 |
| 7.73 | 1.55 | 7.89 | 7.73 | 0.77 | 7.77 |
| 8.18 | 1.64 | 8.35 | 8.18 | 0.82 | 8.22 |

The dimensions of the sealing elements of the present invention can be defined in terms of its maximum dimension a, b and c in mutually orthogonal directions. A measure of the effective size of the sealing element is $$S_E = (a^2 + b^2 + c^2)^{1/2} \quad 2)$$

The method of the present invention uses sealing elements in which the following condition is satisfied:—

$$S_E < S_L \quad 3)$$

By using a plurality of sealing elements having an effective size which satisfies condition 3), it has been found that the sealing elements are responsive to the low pressure differential of the leaks to which the present invention applied. As they respond to the low pressure differential, a number of the sealing elements are drawn to the leak and build up to gradually stem the leak, with a single sealing element not sealing or covering leak.

Figure 1:
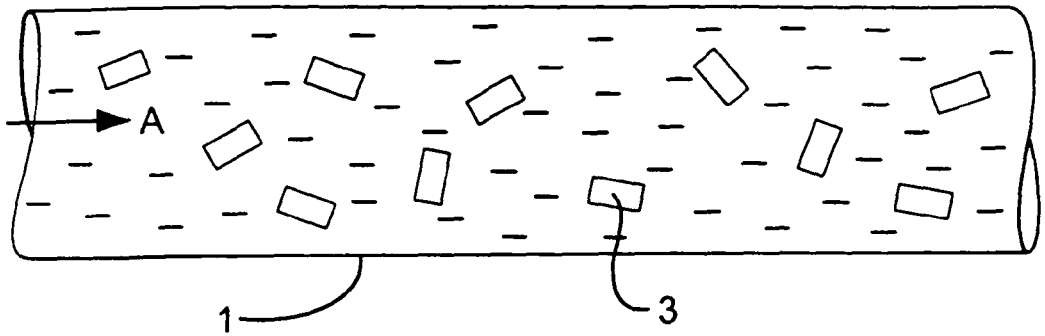
FIG. 1 is a schematic cross-sectional view through a portion of a duct without a small leak, into which sealing elements of the present invention and in accordance with the method of the present invention have been introduced.

Referring to FIG. 1, an open duct 1 (not to scale) is shown with fluid passing there through. The duct is shown as transparent for simplicity. For the purposes of this example, the fluid passing through the duct is water, although the present invention is equally applicable to other fluids, for example crude oil. The direction of flow of the water through the duct is indicated by arrow A. A plurality of sealing elements 3 satisfying condition 3) are introduced into the duct 1. The sealing elements 3 may be introduced into duct 1 by any suitable means, for example through an upstream valve, a pipeline PIG launching system, or by "hot-tapping" the duct in the vicinity of the leak, as discussed herein above.

In this example, each sealing element 3 comprises a substantially rectangular planar substrate of plastics material together with sensing means comprising a magnetic identifier. The substrate and a thickness of 2 mm and an area dimension of 3 by 3 mm resulting in an effective size SE of approximately 4.7 mm. Preferred substrate materials for the sealing elements 3 include polypropylene (for example Priplak (a registered trade mark of Usiplast SA) and Nylon 6-6 which has a specific density of 1.15. Preferred magnetic identifier materials include ceramic magnetic material, and neodynium iron boron magnetic material. The substrate material and magnetic identifier are selected so that the sealing elements have an overall density of approximately 1 gcm$^{-3}$, i.e. they have a substantially neutral buoyancy in the fluid passing through the duct (i.e. water). The neutral buoyancy of the sealing elements 3 is represented in FIG. 1 by the substantially even distribution thereof throughout the fluid in the duct 1. The neutral buoyancy of the sealing elements 3 together with agitation due to background turbulence present in the flow serve to substantially evenly distribute the sealing elements 3 throughout the flow.

FIG. 2 shows a schematic view of a section of the duct 1 which contains a leak 5, which section is downstream of the section of duct 1 shown in FIG. 1. In this example, the leak comprises a crack having an aspect ratio of 10 with a dimension $x_L$ of 8.18 mm and a dimension $Y_L$ of 0.82 mm. Fluid seeps from the leak 5, as represented by arrow B. Seepage through the leak 5 causes a pressure differential within the duct 1 adjacent the leak 5, which attracts sealing elements 3 towards the leak 5, as shown in FIG. 2. One sealing element 3A has already been "captured" by the leak and straddles a portion of the crack.

Referring to FIG. 3, three sealing elements 3 are positioned along parts of the crack 5 to reduce the seepage of fluid there through. At some stage, the leakage flow will be reduced to the point where the pressure differential is no longer sufficient to "capture" the sealing elements 3. In effect, the leak that remains now has an effective size such that the sealing elements no longer satisfy condition 3). In this figure, three sealing elements are shown stemming the leak. It will be appreciated that if sealing elements of a smaller effective size are used, there will be a greater number of sealing elements which build up at the leak.

The sensing means of the sealing elements 3 can be used to detect the location and size of the leak 5. A sensor (not shown) for sensing the sealing elements 3 is incorporated into duct traversing apparatus, for example a pipeline PIG, operating within the duct. The pipeline PIG is preferably sent along the duct once the sealing elements 3 have been released and cleared the duct. The PIG can then detect the sealing elements 3 that have built up over crack 5 as it passes them. The sensor feeds the responses from the identifiers on the sealing elements 3 to a central processing unit (not shown), to thereby identify the location of the crack 5. Indeed, the size of the response and its correlation with the effective size of the sealing elements can give and indication of the size and shape of the crack 5. The sensor may either feed the responses from the identifiers as they are detected, or may store the detected information for transmission at the end of that particular run. The central processing unit may be internal or external to the duct.

It will be understood that the embodiment illustrated describes the invention in one form only for the purposes of illustration. In practice, the invention may be applied to many different configurations, the detailed embodiments being straightforward for those skilled in the art to implement. For example, the sealing elements could be bio-degradable since this would enable them to fulfil their function for the purposes of stemming the leak and leak detection and yet enable their removal easily and non-invasively after the leak has been repaired. Moreover, this can simplify the removal of unwanted sealing elements further downstream. The sealing elements can alternatively be reactive to a flushing compound so that they are removed when contacted by the compound, say by a destructive chemical reaction.

In another embodiment, the sealing elements include a tracer or marker dye which is released when in contact with the fluid in the duct. As a result, when the sealing elements are in place to stem leakage, the tracer or dye is released at the leak location. There will still be an even smaller leakage flow from the duct as the sealing elements stem the leak and the tracer will flow out with this leakage and can therefore be viewed externally of the leak. This is especially useful in the case of sub-sea ducts where currents quickly dilute tracers making detection more difficult. Indeed, by delivering the tracer at the leak, much higher release concentrations can be obtained compared with known techniques of simply releasing the tracer or dye into the duct, which results in only low concentrations actually issuing from the leak.

In a particular form of sealing element, the tracer or dye can be encapsulated in a skin which is formed to burst as it is drawn into the immediate periphery of or actual contact with the leak. Thus, a greater concentration of tracer element can be released at the leak to pass through the leak enabling it to be more easily seen externally of the duct, whilst the skin still acts to help stem the leak.

It will be appreciated that the sealing element can be formed to incorporate a degree of expandability. Thus, as the leak is stemmed, expansion of the sealing elements can further assist in the stemming of the leak. Nylon 6-6 expands slowly by 1.7% over 24 hours. Consequently, in the initial stages, the leak may not be fully stemmed by the plurality of sealing elements attracted to the leak. However, after a period of time, the expansion of the sealing elements can help improve the degree of stemming of the leak. Combining this feature with a slow acting adhesive function can lead to a semi-permanent seal.

The present embodiment has been described in relation to sealing elements of neutral buoyancy. However, in cases where there is considerable turbulence, for example, the buoyancy can be greater or lesser than neutral, to a range of 75% to 125% of the density of the fluid within the duct. It is preferred that it is the range of 90% to 110% or more preferably 95% to 105%.

The invention claimed is:

1. A method for reducing seepage through a leak in a liquid transporting duct, wherein the leak is defined in terms of its maximum dimension $x_L$ and its maximum width in an orthogonal direction $y_L$ and the effective size of the leak is given by:

$$S_L = (x_L^2 + y_L^2)^{1/2} \quad 1)$$

the method comprising:
a) selecting sealing elements that are substantially planar and have an effective size $S_E$ suitable for partially covering the leak, wherein the effective size $S_E$ is less than the effective size $S_L$ of the leak, where the effective size $S_E$ of the sealing element is given by:

$$S_E = (a^2 + b^2 + c^2)^{1/2} \quad 2)$$

and a, b and c are the dimensions of the sealing elements in mutually orthogonal directions; and
b) introducing a plurality of the selected sealing elements into the liquid being transported within the duct wherein, due to the selection of sealing elements having the effective size $S_E$, a plural number of the selected sealing elements are sufficiently small to be drawn by the pressure differential at the locality of the leak to move over and build up over the leak, to be held to the internal surface of the duct wall over the leak by said pressure differential, to thereby reduce the size of the leak.

2. A method according to claim 1 comprising selecting the sealing elements to have a range of effective sizes or a predetermined size distribution appropriate to leaks having a range of effective sizes.

3. A method according to claim 1 comprising selecting the sealing elements to each have an effective size of 5 mm or less.

4. A method according to claim 3 comprising selecting the sealing elements to each have an effective size of 1 mm or less.

5. A method according to claim 4 comprising selecting the sealing elements to each have an effective size in the range from 0.5 to 0.1 mm.

6. A method according to claim 1 comprising selecting the sealing elements to have a density within the range of 75% to 125% of the density of the fluid within the duct.

7. A method according to claim 6 comprising selecting the sealing elements to have a density within the range of 90% to 110% of the density of the fluid within the duct.

8. A method according to claim 7 comprising selecting the sealing elements to have a density within the range of 95% to 105% of the density of the fluid within the duct.

9. A method according to claim 1 comprising selecting the sealing elements to be rectangular elements.

10. A method according to claim 1 including the step of introducing the sealing elements into the duct via an upstream valve, a pipeline PIG launching system, or by hot-tapping the duct in the vicinity of the leak.

11. A method according to claim 1 including the step of forming the sealing element from a plastics substrate and a magnetic or radioactive sensing means for enabling the sealing element to be sensed by a sensor.

12. A method according to claim 11 including the step of sensing the sealing elements.

13. A method according to claim 1 including the step of recovering the sealing elements from the duct downstream of the section of duct being examined, the sealing elements being recovered using a strainer or a strainer having a conical construction.

14. A method according to claim 1 comprising selecting sealing elements with an effective size $S_E$ which is less than the effective size $S_L$ of a leak having an aspect ratio ($x_L/y_L$) in the range of 5 to 10.

* * * * *